(12) United States Patent
Johansen et al.

(10) Patent No.: US 9,462,228 B2
(45) Date of Patent: Oct. 4, 2016

(54) DISTRIBUTED REAL-TIME MEDIA COMPOSER

(71) Applicant: CISCO TECHNOLOGY, INC., San Jose, CA (US)

(72) Inventors: Tom-Ivar Johansen, Oslo (NO); Geir Arne Sandbakken, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 15 days.

(21) Appl. No.: 14/297,135

(22) Filed: Jun. 5, 2014

(65) Prior Publication Data

US 2014/0354766 A1    Dec. 4, 2014

Related U.S. Application Data

(63) Continuation of application No. 13/651,106, filed on Oct. 12, 2012, now Pat. No. 8,773,497, which is a continuation of application No. 12/497,316, filed on Jul. 2, 2009, now Pat. No. 8,289,369, which is a continuation of application No. 10/986,932, filed on Nov. 15, 2004, now Pat. No. 7,561,179.

(30) Foreign Application Priority Data

Nov. 14, 2003 (NO) .................................. 20035078

(51) Int. Cl.
*H04N 7/15* (2006.01)
*H04M 3/56* (2006.01)
*H04N 7/14* (2006.01)
*H04L 29/06* (2006.01)

(52) U.S. Cl.
CPC ............ *H04N 7/152* (2013.01); *H04L 65/403* (2013.01); *H04M 3/562* (2013.01); *H04M 3/567* (2013.01); *H04N 7/14* (2013.01); *H04N 7/15* (2013.01)

(58) Field of Classification Search
CPC .... H04M 3/562; H04M 3/567; H04N 7/152; H04N 7/15; H04N 7/14; H04L 65/403
USPC ........................... 348/14.01–14.16; 709/204; 370/260–261
See application file for complete search history.

(56) References Cited

U.S. PATENT DOCUMENTS

| | | | |
|---|---|---|---|
| 5,659,369 A | | 8/1997 | Imaiida |
| 5,687,095 A | * | 11/1997 | Haskell et al. ............ 348/386.1 |
| 5,953,050 A | * | 9/1999 | Kamata .................. H04N 7/148 348/14.05 |
| 6,288,739 B1 | | 9/2001 | Hales et al. |
| 6,473,137 B1 | | 10/2002 | Godwin et al. |
| 6,523,069 B1 | | 2/2003 | Luczycki et al. |
| 6,553,072 B1 | * | 4/2003 | Chiang et al. ........... 375/240.25 |
| 6,560,280 B1 | | 5/2003 | Shachar et al. |

(Continued)

FOREIGN PATENT DOCUMENTS

| | | |
|---|---|---|
| EP | 691-799 A2 | 6/1995 |
| JP | 1-94786 | 4/1989 |
| WO | WO 99-18728 | 4/1999 |

*Primary Examiner* — Melur Ramakrishnaiah
(74) *Attorney, Agent, or Firm* — Lempia Summerfield Katz LLC (57) ABSTRACT

A system and a method allowing simultaneous exchange of audio, video or data information between a plurality of units over a communication network, supported by a central unit, wherein the central unit is, based on knowledge regarding one or more of the units, adapted to instruct said one or more units to generate multimedia data streams adjusted to fit into certain restrictions to be presented on other units participating in a same session.

16 Claims, 3 Drawing Sheets

(56) References Cited

U.S. PATENT DOCUMENTS

| | | |
|---|---|---|
| 7,007,098 B1 | 2/2006 | Smyth et al. |
| 7,627,629 B1 * | 12/2009 | Wu et al. .................. 709/204 |
| 2002/0126201 A1 | 9/2002 | Schmitt et al. |
| 2003/0058936 A1 | 3/2003 | Peng et al. |
| 2004/0008635 A1 | 1/2004 | Nelson et al. |
| 2004/0022202 A1 | 2/2004 | Yang et al. |
| 2005/0013309 A1 | 1/2005 | Ravishankar et al. |

\* cited by examiner

DISTRIBUTED REAL-TIME MEDIA COMPOSER

CROSS REFERENCE TO RELATED APPLICATIONS

The present continuation application claims the benefit of priority under 35 U.S.C. 120 to application Ser. No. 13/651,106, filed Oct. 12, 2012, which is a continuation of U.S. application Ser. No. 12/497,316, filed on Jul. 2, 2009, now U.S. Pat. No. 8,289,369, which is a continuation of Ser. No. 10/986,932, filed on Nov. 15, 2004, now U.S. Pat. No. 7,561,179, and claims the benefit of priority under 35 U.S.C. 119 from Norwegian Patent Application number 20035078, filed on Nov. 14, 2003, and the entire contents of each of which are hereby incorporated herein by reference. The present application contains subject matter related to pending U.S. application Ser. No. 10/699,849, filed Nov. 4, 2003, pending U.S. application Ser. No. 10/699,850, filed Nov. 4, 2003, pending U.S. application Ser. No. 10/724,043, filed Dec. 1, 2003, pending U.S. application Ser. No. 10/722,479, filed Nov. 28, 2003, pending U.S. application Ser. No. 10/819,108, filed Apr. 7, 2004, pending U.S. application Ser. No. 10/831,158, filed Apr. 26, 2004, pending U.S. application Ser. No. 10/871,026, filed Jun. 21, 2004, pending U.S. application Ser. No. 10/880,460, filed Jul. 1, 2004, and pending U.S. Ser. No. 10/971,030, filed Oct. 25, 2004, and the entire contents of each are hereby incorporated herein by reference.

BACKGROUND OF THE INVENTION

1. Field of the Invention

The present invention relates to systems allowing simultaneous exchange of audio, video and data information by the use of telecommunication. In particular, it relates to videoconferencing and web conferencing systems.

2. Discussion of the Background

In particular the invention describes a system and a method allowing simultaneous exchange of audio, video and data information between pluralities of units, using existing telecommunication networks.

There are a number of technological systems available for arranging meetings between participants located in different areas. These systems may include audio visual multipoint conferences or videoconferencing, web conferencing and audio conferencing.

The most realistic substitute of real meetings is high-end videoconferencing systems. Conventional videoconferencing systems comprise a number of end-points communicating real-time video, audio and/or data streams over and between various networks such as WAN, LAN and circuit switched networks. The end-points include one or more monitor(s), camera(s), microphone(s) and/or data capture device(s) and a codec. The codec encodes and decodes outgoing and incoming streams, respectively.

Multimedia conferences maybe divided into three main categories; centralized, decentralized and hybrid conferences, wherein each category has a plurality of variations for running a conference.

Centralized Conferences

Traditional Audio Visual Multipoint conferences have a central Multipoint Control Unit (MCU) connected to three or more endpoints. These MCU's perform switching functions to allow the audiovisual terminals to intercommunicate in a conference. The central function of an MCU is to link multiple video teleconferencing sites (EP—endpoints) together by receiving frames of digital signals from audio-visual terminals (EP), processing the received signals, and retransmitting the processed signals to appropriate audiovisual terminals (EP) as frames of digital signals. The digital signals may include audio, video, data and control information. Video signals from two or more audiovisual terminals (EP) can be spatially mixed to form a composite video signal for viewing by teleconference participants. The MCU acts as a selective router of media streams in this scenario. A part of the MCU called the Multipoint Controller (MC) controls the conference. Each endpoint has a control channel for sending and receiving control signals to and from the MC. The MC acts on and sends commands to the endpoints.

Voice Switch Single Stream

In a centralized conference the MCU will receive incoming video streams from all of the participants. It may relay one video stream from one endpoint to all the other endpoints. Which endpoint stream is selected, is typically, for the voice switched single stream solution, based on which participant talks the loudest, i.e., the speaker. This stream is called the Current View. Whereas the Previous View is the video stream from the participant at the endpoint who was the speaker before the current speaker. In a Voice Switched Conference, a Current View video stream is sent to all, other than the current speaker, and the Previous View will be sent to the current speaker. A problem for the MCU is to ensure that the Current View and the Previous view are receivable by all endpoints in the conference.

Switch Single Stream by Other Means

The Current view may also be controlled by sending commands between the MCU and the endpoints. One such mechanism is called floor control. An endpoint can send a floor request command to the MCU so its video will be sent to all other participants. The Previous View will then typically be a Voice Switch View between all the other participants in the conference. The Current View can be released by sending a floor release command. There are other known methods of controlling the Current view, such as floor control or chair control. Floor control and chair control both deal with switch single stream. The principle, however, with a current view and switch of a single stream is the same.

Continuous Presence

In a conference, one would often like to see more than one participant. This can be achieved in several ways. The MCU can combine the incoming video streams to make one or more outgoing video streams. Several incoming low-resolution video streams from the endpoints can be combined into a high-resolution stream. The high-resolution stream is then sent from the MCU to all or some of the endpoints in the conference. This stream is called a Combined View.

The characteristic of the low-resolution streams limit the format of the high-resolution stream from the MCU. Strict limitations on the incoming low-resolution streams are necessary to ensure that the combined high-resolution stream is receivable by all the endpoints receiving it. The MCU has to, as long as every receiver will receive the same multimedia stream, find "the least common mode," to ensure acceptable viewing and listening characteristics at the receiver with the poorest capacity. With the many variations of monitors, the MCU should also compensate for different monitors such as 4:3 or 16:9 views. This is not possible with a common mode. This least common mode solution doesn't scale particularly well and it puts heavy restriction on the receivers who has a capacity exceeding the one with the poorest capacity.

Rescaled View

A more flexible solution is to let the MCU rescale all the incoming video streams and make a view receivable to all endpoints that receive it. In order to do the rescaling, the MCU needs to decode all the incoming video streams. The decoded data—raw data—is then rescaled and transformed. The different raw data streams are then combined in a composite layout, put together given a set layout, and tailored to the receiver requirements for bitrate and coding standard. The raw data combined stream is then encoded, and we will have a new video stream containing one or more of the incoming streams. This solution is called the Resealed View. To make a Resealed View, the MCU must understand and have the capacity to encode and decode video streams. The more endpoints in the conference, the more capacity the MCU needs in order to decode all the incoming streams. The heavy data manipulation performed by the MCU will add extra delay to the multimedia streams and hence reduce the quality of the multimedia conference; the higher number of endpoints the heavier the data manipulation. Scalability is a concern in a solution like this. The layout may be different to all decoders to avoid that end users see themselves in delayed video on the monitor. Depending on the number of different layouts, different outgoing streams must be encoded. An MCU might differentiate between the endpoints themselves or by groups of endpoints, exemplified by two groups, one for low bitrates giving a first view and one for high bitrates giving a second view.

Decentralized Conference

In a decentralized multipoint scenario, one will only need one centralized MC. Each endpoint will send its media data to all other endpoints—typically by multicast. Each endpoint will mix the audio from all the other endpoints, and will combine or select which video streams to show locally. The MC will still act as the controller for the conference, and each endpoint will have a control connection with the MC.

In a decentralized conference, each endpoint must have the MCU functionality showing a Current/Previous view, Combined View or a Resealed View. The complexity of an endpoint supporting decentralized conferences is higher than for endpoints supporting centralized conferences.

Hybrid Conference

A hybrid conference uses a combination of centralized and decentralized conferences. Some endpoints will be in a centralized conference, and other will be in a decentralized conference. A hybrid conference may have centralized handling of one media stream, and a decentralized distribution of another. Before the start of the multimedia conference, the centralized MCU will send commands to each endpoint participating in the conference. These commands will, among other things, ask the endpoint to inform the MCU of its bit rate capabilities and its codec processing capacity. The information received will be used by the centralized MCU to set up a multimedia hybrid conference, wherein the characteristic of each endpoint is taken into account.

The term hybrid will also be used where audio is mixed at the MCU and each endpoint selects and decodes one or more incoming video streams for local view.

Scalable Signal Compression

Scalable signal compression algorithms are a major requirement of the rapidly evolving global network which involves a variety of channels with widely differing capacities. Many applications require data to be simultaneously decidable at a variety of rates. Examples include applications such as multicast in heterogeneous networks, where the channels dictate the feasible bit rates for each user. Similarly, scalable signal compression is motivated by the co-existence of endpoints of differing complexity and cost. A compression technique is scalable if it offers a variety of decoding rates and/or processing requirements using the same basic algorithm, and where the lower rate information streams are embedded within the higher rate bit-streams in a manner that minimizes redundancy.

Several algorithms have been proposed that allow scalability of video communication, including frame rate (Temporally scalable coding), visual quality (SNR) and spatial scalability. Common for these methods is that video is coded in layers, where the scalability comes from decoding one or more layers.

Temporally Scalable Coding

Video is coded in frames and a temporally scalable video coding algorithm allows extraction of video of multiple frame rates from a single coded stream. The video is divided into multiple interleaved sets of frames. By decoding more than one set of frames the framerate is increased.

Spatial Scalable Coding

Spatial scalable compression algorithm is an algorithm where the first layer has a course resolution, and the video resolution can be improved by decoding more layers.

SNR Scalable Coding (Visual Quality Scalable Coding)

SNR-scalable compression refers to encoding a sequence in such a way that different quality video can be reconstructed by decoding a subset of the encoded bit stream. Scalable compression is useful in today's heterogeneous networking environment in which different users have different rate, resolution, display, and computational capabilities.

In a traditional centralized system, the endpoints will send a "full-scale" picture to a MCU, as an example a coded CIF picture (352×288 pixels) will be sent to the MCU. To improve the quality of the conference it will be helpful to present a composite picture at each endpoint. This composite picture may show one participant as a main fraction of a full screen whereas all the other participants are shown as smaller sub-pictures. Which participant, the size of the participant and how many participants that are displayed at each site may depend on processing and display capabilities and the conference situation. If each endpoint is supposed to receive composite pictures, the MCU has to perform heavy data manipulation as described in continuous presence and resealed view. After decoding the coded CIF data streams to video pictures, the MCU will compose composite pictures that will be reencoded and sent to the appropriate endpoint.

This solution puts heavy demand on the capacity of the central MCU, and will, in cases where heavy use of encoding and decoding is necessary, introduce an annoying delay between the participants of a multimedia conference.

SUMMARY OF THE INVENTION

It is an object of the present invention to provide a system and a method that eliminates the drawbacks described above. The features defined in the claims enclosed characterize this system and method.

In particular, non-limiting embodiments of the present invention describe a method and system for exchange of information between a number of units where a central unit, based on information regarding a plurality of subunits, will instruct the subunits to generate multimedia data streams adjusted to other subunits participating in the same session in such a manner that the central unit is able to route data streams without the use of its embedded codecs or a minimal use of said codecs.

BRIEF DESCRIPTION OF THE DRAWINGS

In order to make the non-limiting embodiments of the invention more readily understandable, the discussion that follows will refer to the accompanying drawings.

DESCRIPTION OF THE EMBODIMENTS OF THE INVENTION

As indicated above, all the solutions have drawbacks. One characteristic of a quality video conference will be that it includes the possibilities of showing composite windows, or combined view and correct layouts (i.e. 4:3, 16:9) without annoying time delays. All these requirements should be met with existing equipment, that is, with MCU's that are available today. The known solutions do not scale very well. Specifically, they don't take into account the different capacities of different endpoints in a conference. Ideally, each endpoint should receive data streams tailored for their capacity and layout. Further, data processing performed at the central MCU should be minimized. The weaknesses indicated apply to centralized, decentralized as well as hybrid solutions.

To overcome the above mentioned weaknesses, non-limiting embodiments of the invention take advantage of using decentralized processing power at the participating endpoints as well as taking advantage of using a command language to instruct each participating endpoint on how to take part in the conference.

A non-limiting embodiment uses the available decentralized capacity as much as possible. The demands on the central MCU will be reduced. Further, it is important for optimalization that the scaling is done well. The MCU will use a command language to get information about each single endpoints capacity as a receiver and a transmitter, regarding available bit rate, and coding capacity and so forth. The MCU will adapt the data streams to each endpoints according to their specifications. As a result, one will have a system that scales well.

The MCU will collect information regarding each single endpoints encoding capacity with regard to how many multiple frames could be made at what resolution, the bit rates and the frame rates. Further, the MCU will have information regarding the endpoints layouts etc, as indicated above. The MCU will be capable of analyzing this information and customizing a conference. Based on information about the encoding capabilities of the endpoints, the endpoints will utilize its capacities to send optimized multimedia streams. Thus, the need for processing at the MCU will be severely reduced in comparison to what is normal for a conference of a similar quality.

Voice Switched Continuous Presence

The encoders may be instructed to send a larger but still reduced stream to the MCU. The instructions will be sent in a command language from the MC in the central MCU to each multimedia conference participant's encoders. The endpoints may also be instructed to send the reduced stream and a smaller stream. The MCU may then combine the streams to a current view, with the speaker in a "large" window together with the rest of the participants in smaller windows. The speaker may receive the previous speaker in a "large" window with the rest of the participants in "small" windows.

The needed MCU capacity may be reduced significantly by controlling the size of each stream and the bit rate used. The MC will use the encoder and decoder capabilities exchanged in a command set to select the appropriate layouts. Encoder capabilities will restrict the size and the number of partial frames from an endpoint, and decoder capabilities will restrict how many partial frames and how large of a partial frame an endpoint can receive. This will form the basis on which the MCU may decide its layouts.

The MCU will instruct the endpoints to send one or more partial frames of the session. The size of these partial frames will depend on the number of participants in the conference and the chosen layout, the MCU will give instructions to the endpoints at the session start regarding the size of the partial frames. Thus, each endpoint will send a fraction of a composite picture in the requested format. The MCU may also give additional commands during the session to change the layout. The amount of data that has to be encoded at the endpoint will accordingly be substantially smaller, at least for the non speaking participants. The MCU will receive encoded pictures that already have the correct format. Hence, the MCU doesn't have to decode the incoming video streams. The MCU will only put the composite pictures together from the incoming partial frames without any decoding or encoding. This may be achieved by manipulating high level syntax in the video stream to produce one combined frame, or by identification labeling and forwarding a selection of the video streams to all endpoints, where they may be separately decoded and joined for a composite view.

Thus, the need for processing power is severely reduced and by avoiding processing of the video streams, the delay will be reduced accordingly.

In a centralized conference, the MCU will instruct the endpoints in the conference to make one or more partial frames. The endpoints will encode its video streams to comply with the format of these partial frames. The partial frames are then sent from the endpoint to the MCU. The MCU will combine the partial frames into one or more combined frames. The structures of these combined frames are called layouts. The layouts contain the format for the partial frames received for a given set of combined frames, and the instructions sent to each endpoint are derived from the layouts of these combined frames. Typically, a layout is defined for the Current View with a 4:3 scaled frame, and another for a 16:9 scaled frame. The combined frame for the Previous View will typically be scaled to match the endpoint receiving it following the same principle as for the Current View. The combined frames are sent to each endpoint in the conference given the best matching layout for that specific endpoint.

In a decentralized conference, the MC will instruct the endpoints in the conference to make one or more partial frames. The endpoints will encode its video streams to comply with the format of these partial frames. These partial frames are distributed to all endpoints in the conference. Each endpoint will combine the partial frames into combined frames given a set of layouts. The layouts are decided and signaled by the MC to each endpoint separately. Different endpoints in the conference may have different layouts assigned to them. Typically some endpoints are combining partial frames into a Current View, while others are combining into a Previous View.

The central MCU will, with the use of a command language communicated over the control channels, request the endpoint to give information concerning their capacity regarding bit rates, layouts, and compression algorithms.

The central MCU will, based on the responses from the decentralized MCU's, set up a session that is tailored to each endpoints specification regarding bit rates and the other parameters described above. The invention may use scalability as described above to code the multiple video streams at various bitrates and resolution to ensure best usage of the available bandwidth.

Signaled Command Set

Signaled command set describes the command set between the central MCU and each endpoint. The Command set is used to instruct coding of partial frames at the endpoints and the layout of the video streams, and the capability set describes the format range that can be received at each endpoint. Commands to align or change capabilities may also be a part of the language.

A First Embodiments of the Invention

Centralized Conference Example

Figure 1:
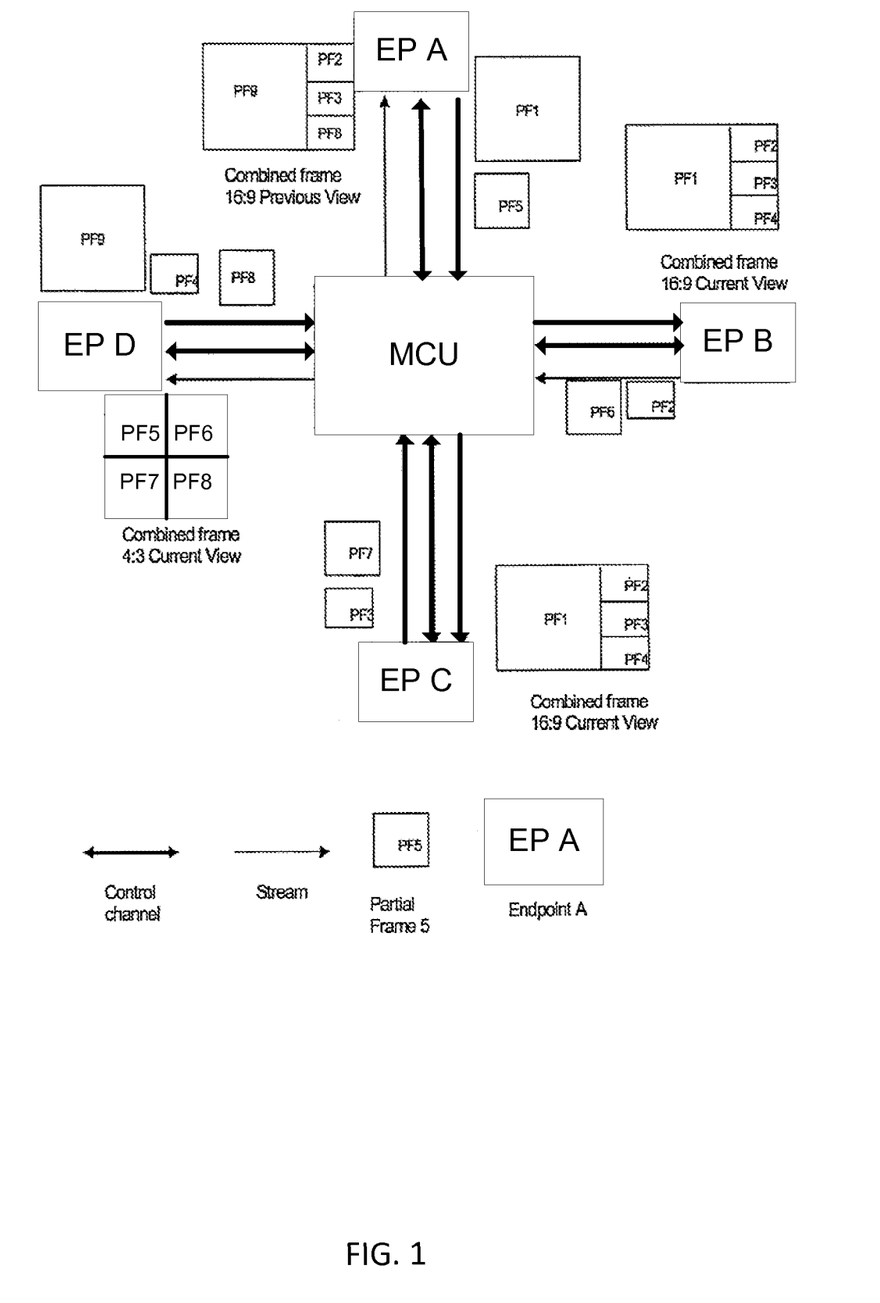
FIG. 1 shows an example of a centralized conference, with four endpoints participating in a videoconference according to a non-limiting embodiment of the invention.

The example of a centralized conference is shown in FIG. 1. The example contains a central MCU. The MCU has a conference with 4 endpoints. These are given the names Endpoint A, B, C and D. Each endpoint has a bi-directional control channel, a video stream going from the endpoint to the MCU and a video stream going from the MCU to the endpoint. The current speaker in the conference is at Endpoint A, and Endpoint A is therefore receiving a combined frame of the Previous View. All other endpoints in the conference are receiving different combined frames of the Current View. Endpoint D is the previous speaker. The MCU signals, by the command set described above, Endpoint A to produce two partial frames. These are Partial Frame 1 and Partial Frame 5. The size, format and scale of both partial frames are signaled specifically. The Partial Frame 1 is part of the layout for the 16:9 Current View selected by the MCU. The Partial Frame 5 is part of the layout for 4:3 Current View also selected by the MCU. The MCU continuously receives a video stream from Endpoint A containing the format of both Partial Frame 1 and Partial Frame 5 until a new command is signaled from the MCU to Endpoint A.

Similarly, as for Endpoint A—the MCU is signaling Endpoint B to encode Partial Frame 2 and Partial Frame 6; Endpoint C to encode Partial Frame 3 and Partial Frame 7; and Endpoint D to encode Partial Frame 4, Partial Frame 8, and Partial Frame 9.

The MCU receives all Partial Frames 1 to 9. With the Layout for the "Combined Frame 16:9 Current View," the MCU combines Partial Frame 1, Partial Frame 2, Partial Frame 3, and Partial Frame 4. This combined frame is sent to Endpoint C and Endpoint B. Both have signaled that they can receive a 16:9 scaled frame. With the layout for "Combined Frame 4:3 Current View," the MCU combines Partial Frame 5, Partial Frame 6, Partial Frame 7 and Partial Frame 8. This combined frame is sent to Endpoint D which can only receive a 4:3 scaled frame.

Combining Partial Frame 9, Partial Frame 2, Partial Frame 3 and Partial Frame 5 makes the layout for "Combined Frame 16:9 Previous View".

Example of a Command Set for Implementation in a Non-Limiting Embodiment of the Invention This example is a reduced exchange of information between the participating units to illustrate how the communication may be implemented. In a real situation the various capabilities of the endpoints such as coding standards and bandwidth, and the capabilities of the MCU may cause several rounds of exchange to align the capabilities. Additions of new endpoints on the fly may also cause realigning of capabilities during the session.

For simplicity, this exchange of information assumes that the MCU capabilities are all encompassing and that the endpoint's capabilities match so that no such alignment is necessary. This is also an actual case when all units in the session are of the same type.

In this example, several endpoints get the same layout. In a real case, each endpoint may have different layouts and even different aspect ratios according to its display.

Capability Exchange

The exchange between participating units gives information regarding processing capabilities such as standards, image size, framerate and bandwidth.

Encoder/Decoder Capability

DECCAP—{ProcessingRate, NumberOfStreams, TotalImageSize, Bandwidth}

ENCCAP—{ProcessingRate, NumberOfStreams, TotalImageSize, Bandwidth}

ProcessingRate—The ability to process video elements. These elements may be measured in MacroBlocks (MBs) which is a group of 16×16 pixels.

NumberOfStreams—The number of separate streams that may be handled.

TotalImageSize—The maximum combined size of all streams, here also measured in MBs. The image description could also contain the image aspect ratio.

Bandwidth—The maximum total data rate that can be sent or received.

Commands:

A small set of commands that will enable exchange of data.

CODE-SEQn—{Resolution, FrameRate, Bandwidth}

A command to an encoder forcing encoding of one video stream with a set of constraints.

Resolution—The size of the video image, here measured in MBs.

FrameRate—The number of video images that can be sent per second (F/s).

Bandwidth—The number of bits per second that can be used for this video stream (Bits/s).

STOP-SEQn

A command to stop encoding of a particular video stream.

LAYOUT—{Mode, SEQ1, SEQ2, . . . , SEQm}

A command to a decoder telling it how to place a number of streams on the display.

Mode—The particular chosen layout e where the number of streams and its position on the screen is defined.

SEQl . . . m—The ID of the sequences that shall be placed in the defined layout. The order of the sequences gives the position. If a particular position shall have no stream SEQO may be used.

Request:

GET-FLOOR

The handing over of the current talker to a particular endpoint.

Data Exchange:

VIDEO-FRAME-SEQn

The coded video data for one frame of particular video sequence. For simplicity, the data units for a video sequence is defined as one frame.

Figure 2:
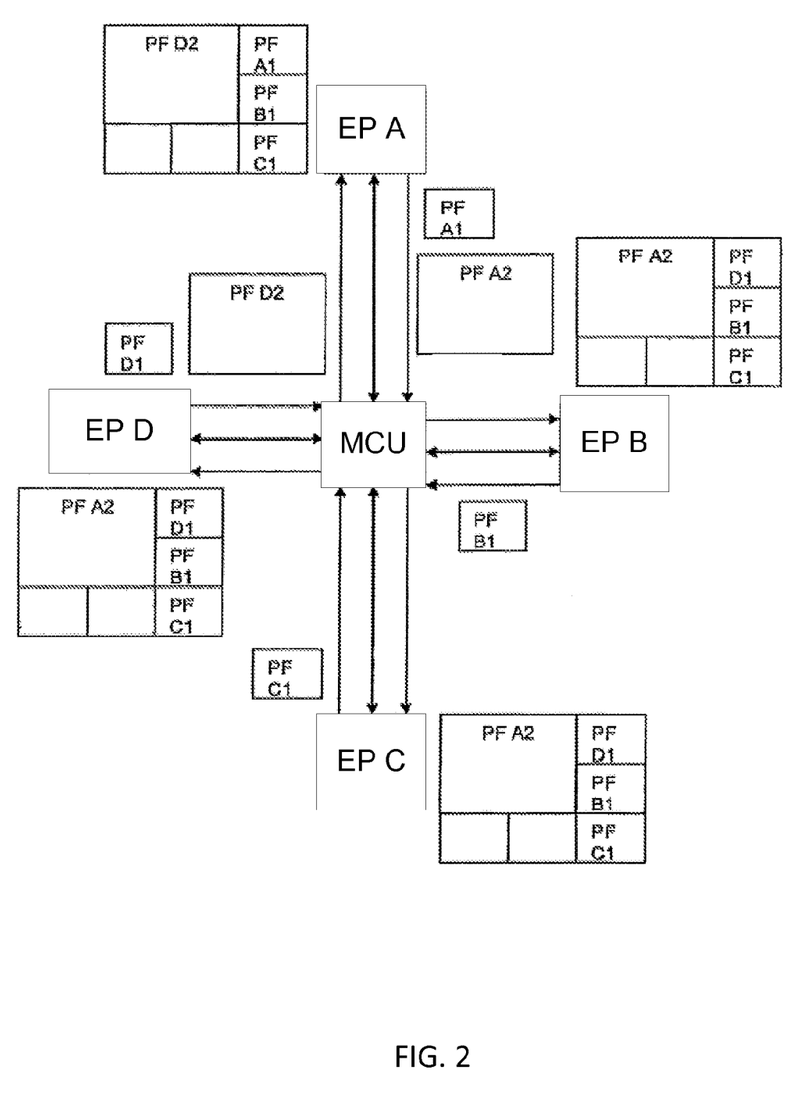
FIG. 2 shows an exemplification of the invention with four endpoints participating and EP A as current talker and EP D as previous talker.

The example used is as shown in FIG. 2, where EP A is the current talker and EP D is the previous talker. Further, capability exchange, commands for session start, commands for grabbing floor and data exchange are shown in the following schemes.

Capability Exchange:

Commands for session start:

Commands for grabbing floor:
B becomes the current talker and A the previous talker.

Data Exchange:

Using the same situation as described above, in a decentralized conference, the MC would instruct EP A to code and broadcast PF1 to EP B and C and to send PF5 to EP D. EP B would broadcast PF 2 to EP A, B and C and send PF 6 to EP D. EP C would broadcast PF 3 to EP A, B and C and send PF 7 to EP D. Finally, EP D would broadcast PF 4 to EP A, B and C. It would send PF 8 to EP D and it would send PF 9 to EP A.

Figure 3:
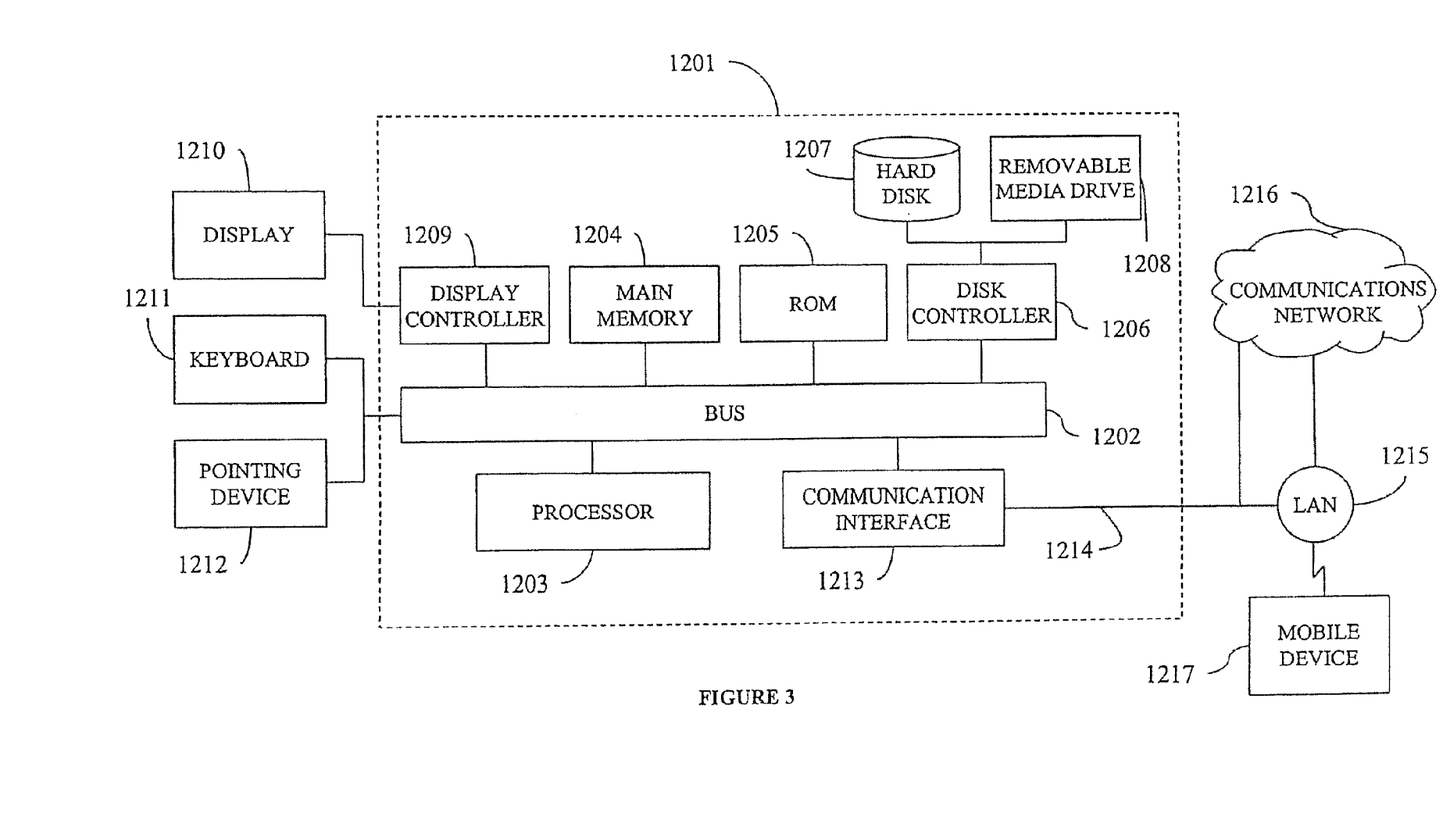
FIG. 3 depicts a computer system upon which an embodiment of the present invention may be implemented.

FIG. 3 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions.

The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Some of the advantages according to the present invention are summarized in the following:

Reduced processing requirement in the central unit. This leads to a more scalable solution.
Reduced delay in transmission compared to transcoding.
Reduced processing power at endpoints due to smaller total picture size.
Better video quality as no rescaling is necessary at the central unit or the endpoints.

While this invention has been particularly shown and described with references to embodiments thereof, it will be understood by those skilled in the art that various changes in form and details may be made therein without departing from the spirit and scope of the invention as defined by the appended claims.

In the above examples, the non-limiting embodiments of the present invention are exemplified with the use of 4:3 and 16:9 scaled frames on a display. However the solution is not limited to the use of these aspect ratios. Other known aspect ratios including, for example, 14:9 or other ratios that may be dividable into a grid pattern on a display may be implemented.

As an example, the idea of using partial frames based on the knowledge of each endpoint in a conference, can be expanded to be used wherever there is a need to send multimedia streams between a plurality of users. The concept will be of interest within traditional broadcasting, particularly when covering real time events. Imagine a scenario where a plurality of film cameras are used to cover an event. If each single camera is transferring its information to a centralized unit in accordance to rules negotiated between the centralized unit and the cameras, a lot of processing power could be saved at the centralized unit. Further, it would be much easier and faster to process composite/PIP frames for the end users.

Another example is that as the physical requirement of the described MCU and the MC become similar, any combination of Centralized and Decentralized conference may be performed. It is also expected that embodiments may have traditional MCU's as part of the network to be backwards compatible with today's solutions.

ABBREVIATIONS AND REFERENCES

Endpoint: Any terminal able to join a conference.
Media: Audio, Video and similar data
Stream: Continuous media.
Multipoint control unit (MCU): Entity that controls and handles media for 3 or more endpoints in a conference
Multipoint Controller (MC): Handles control for 3 or more endpoints in a conference.
Centralized conference: The control channels are signaled unidirectional or bi-directional between the endpoints and the MCU. Each endpoint sends it's media to the MCU. The MCU mix and combine the media and send the media back to the endpoints.
Decentralized conference: The control channels are signaled unidirectional or bi-directional between the endpoints and the MCU. The media is transported as multicast between the endpoints, and the endpoints mix and combine the media themselves.
Hybrid conference: The MCU is having a conference that is partially centralized and partially decentralized.
Speaker: The participant(s) at the endpoint talking the loudest among the endpoints in a conference.
Current view: The video stream from the current speaker.
Previous view: The video stream of the previous speaker.
Combined view: A high-resolution video stream made out of low-resolution video streams.
Resealed view: A video stream made out of other video stream by resealing.

The invention claimed is:
1. An apparatus, comprising:
control circuitry configured to:
communicate over a network with first and one or more second devices;
control routing, as streams, of a plurality of partial frames of a multimedia data stream from the first device to the one or more second devices, by routing respective streams of the multimedia data stream to the one or more second devices based on one or more of respective processing and bandwidth capacities of the one or more second devices, wherein the plurality of partial frames differ by one or more of a bit rate, resolution, a frame rate, and an aspect ratio.

2. The apparatus according to claim 1, wherein the control circuitry is configured to transmit a request to the first device that the first device transmit the multimedia data stream in the plurality of partial frames based on encoding capabilities of the first device and the respective processing and bandwidth capacities of the one or more second devices.

3. The apparatus according to claim 2, wherein the control circuitry is configured to receive the encoding capabilities of the first device from the first device via the network.

4. The apparatus according to claim 2, wherein the control circuitry is configured to receive the respective processing and bandwidth capacities of the one or more second devices from the one or more second devices via the network.

5. The apparatus according to claim 1, wherein the respective streams routed from the first device include a lower quality format that is of a lower quality than a quality of the plurality of partial frames of a request.

6. The apparatus according to claim 5, wherein the multimedia data stream is formatted using a scalable compression technique.

7. The apparatus according to claim 1, wherein the respective processing and bandwidth capacities of the one or more second devices include a display resolution and/or an aspect ratio of respective displays of the one or more second devices to display one of the streams.

8. The apparatus according to claim 7, wherein the respective processing and bandwidth capacities of the one or more second devices include information of a size of a window in which a video component of the multimedia data stream is to be displayed by the one or more second devices.

9. The apparatus according to claim 1, wherein the control circuitry is configured to route the respective streams by receiving the respective streams and transmitting the respective streams to the one or more second devices without performing video processing on the respective streams.

10. The apparatus according to claim 9, wherein the control circuitry is configured to route the respective streams by labeling the respective streams and then transmitting the respective streams to the one or more second devices without decoding the multimedia data stream.

11. The apparatus according to claim 1, wherein the control circuitry is configured to route the respective streams to the one or more second devices without decoding the multimedia data stream.

12. The apparatus according to claim 1, wherein the control circuitry is configured to route the respective streams to a plurality of the second devices contemporaneously.

13. The apparatus of claim 1, wherein the control circuitry is further configured to:

communicate over the network with a third device, wherein one or more partial frames from the third device are combined with one or more partial frames from the first device into a composite frame.

14. A method, comprising:

communicating, by an apparatus, over a network with a first device and a second device;

receiving a first partial frame from the first device;

receiving a second partial frame from the second device;

routing, by the apparatus, the first partial frame from the first device to the second devices based on one or more of respective processing and bandwidth capacities of the second device; and routing, by the apparatus, the second partial frame from the second device to the first device based on one or more of respective processing and bandwidth capacities of the first device;

wherein the first and second partial frames differ by one or more of a bit rate, a resolution, a frame rate, and an aspect ratio.

15. The method of claim 14, wherein the respective streams routed from the first device include a lower quality format that is of a lower quality than a quality that is requested.

16. A non-transitory computer-readable medium including executable instructions to be executed by a processor to cause the processor to perform:

communicating over a network with a first device, a second device, and a third device;

routing a first partial frame of a first resolution or a first aspect ratio of a multimedia data stream from the first device to the second device based on one or more of respective processing and bandwidth capacities of the second device, and routing a second partial frame of a second resolution or a second aspect ratio of a multimedia data stream from the first device to the third device based on one or more of respective processing and bandwidth capacities of the third device.

* * * * *